United States Patent [19]
Cunningham

[11] Patent Number: 5,428,917
[45] Date of Patent: Jul. 4, 1995

[54] FISHING LURE

[76] Inventor: Roy D. Cunningham, P.O. Box 2244, Columbus, Miss. 39704

[21] Appl. No.: 206,838

[22] Filed: Mar. 7, 1994

Related U.S. Application Data

[63] Continuation-in-part of Ser. No. 95,023, Jul. 8, 1994, abandoned.

[51] Int. Cl.⁶ .............................................. A01K 85/00
[52] U.S. Cl. ................................. 43/42.21; 43/42.19; 43/42.46; 43/42.2
[58] Field of Search .............. 43/42.19, 42.2, 42.21, 43/42.37, 42.46, 42.41

[56] References Cited

U.S. PATENT DOCUMENTS

| | | | |
|---|---|---|---|
| D. 162,741 | 4/1951 | Lawhon | 43/42.19 |
| 1,333,318 | 3/1920 | Kijima | 43/42.2 |
| 2,167,335 | 7/1939 | Hayes | 43/42.46 |
| 2,169,929 | 8/1939 | Schumann | 43/42.37 |
| 2,306,020 | 12/1942 | Hughes | 43/42.21 |
| 3,012,358 | 12/1961 | Multanen | 43/42.46 |
| 4,016,671 | 4/1977 | Larsen | 43/42.19 |
| 4,038,774 | 8/1977 | Mistak | 43/42.46 |
| 4,703,579 | 11/1987 | Kay | 43/42.19 |

FOREIGN PATENT DOCUMENTS 8182 of 1913 United Kingdom ............... 43/42.19

*Primary Examiner*—Kurt Rowan
*Attorney, Agent, or Firm*—Popham, Haik, Schnobrich & Kaufman, Ltd.

[57] ABSTRACT

A hollow soft flexible rubber-like fish lure has reactive propeller-like surfaces which cause the lure to rotate about its axis in response to movement through the water. The propeller-like surfaces consists of two diametrically-opposed "blades" to provide a flattened contour. The rearward end of the lure also has a flattened contour in the same plane as the propeller. The overall flattened contour of the lure causes it to float when it strikes the surface of the water, and to create an unusual splash when a flattened side rolls over and strikes the surface of the water.

21 Claims, 4 Drawing Sheets

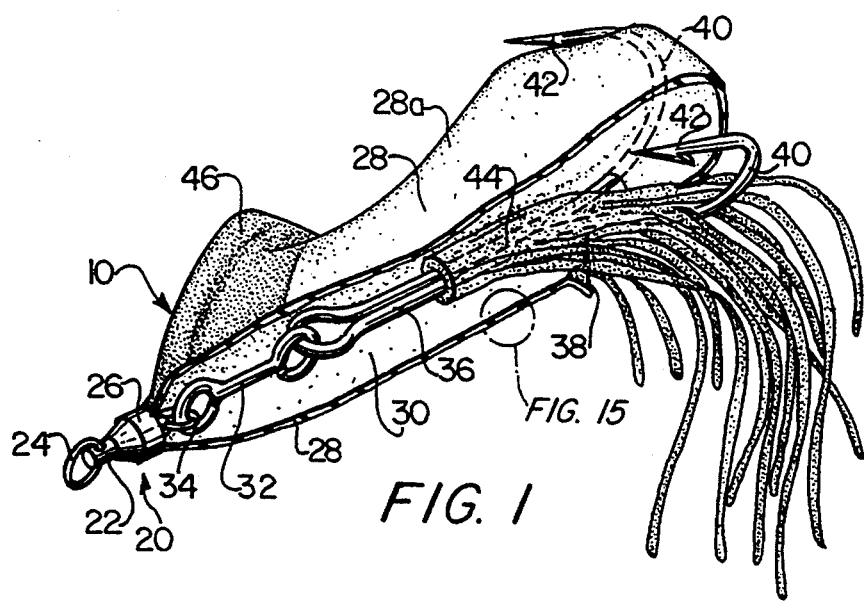
FIG. 1
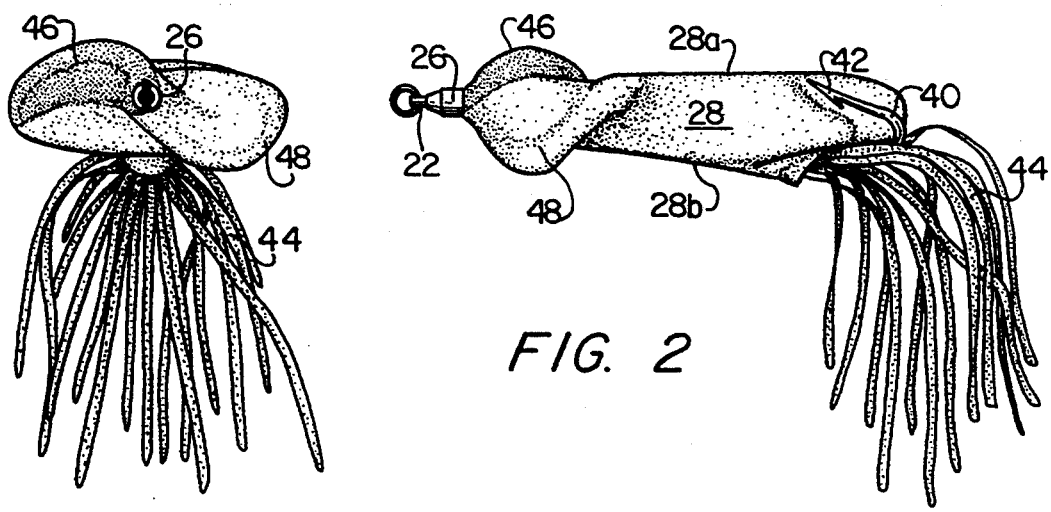
FIG. 4
FIG. 2
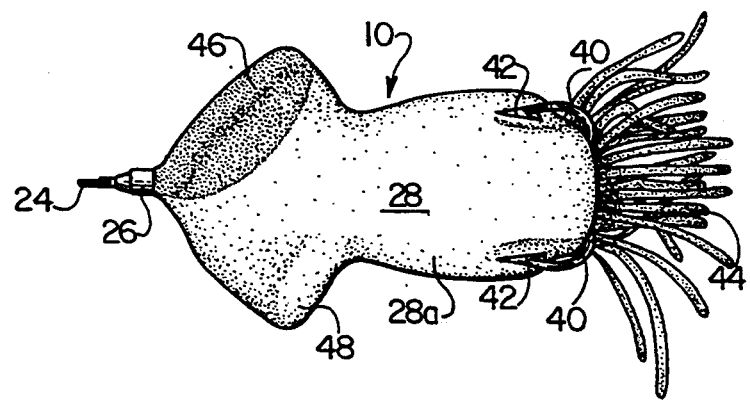
FIG. 3

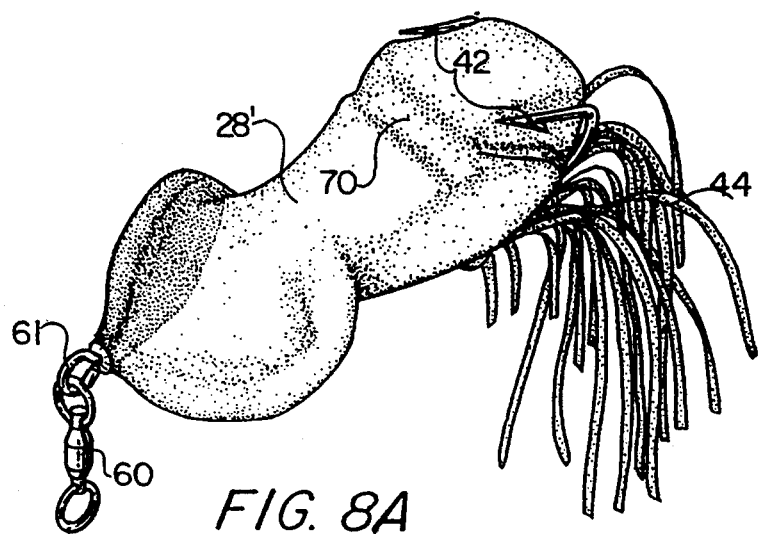
FIG. 8A
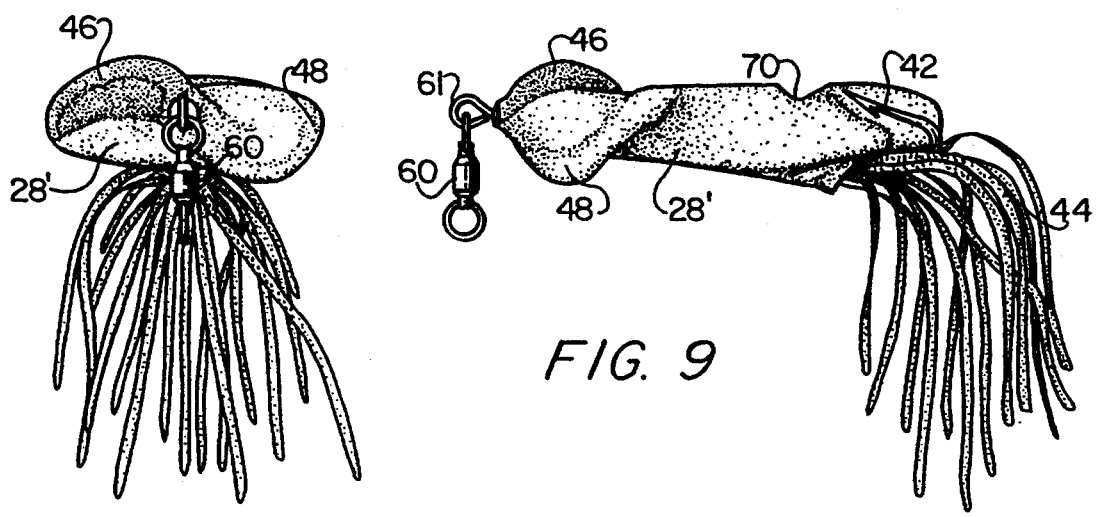
FIG. 11
FIG. 9
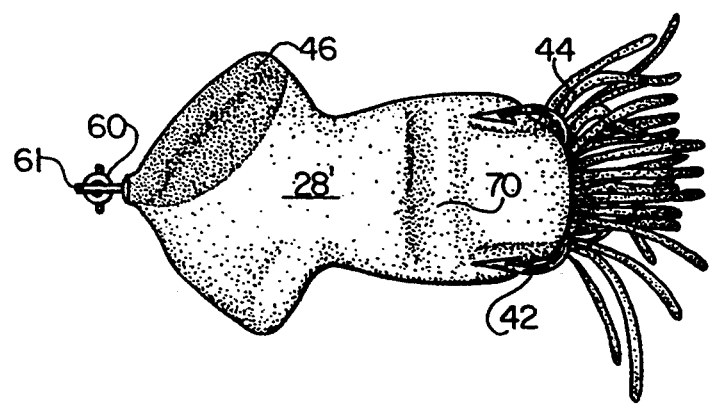
FIG. 10

FISHING LURE

The present application is a continuation-in-part of my U.S. patent application Ser. No. 08/095,023, filed Jul. 8, 1994, and which is incorporated herein by reference in its entirety, now abandoned.

BACKGROUND OF THE INVENTION

The present invention is in the field of fishing lures and is more specifically directed to the fields of hollow flexible lures and rotating lures which float on top of the water and also rotate or spin as they move through the water.

Prior known fishing lures have employed soft flexible rubber-like bodies in which hook means are provided such as shown in prior U.S. Pat. No. Des. 327,311 and abandoned application Ser. No. 07/574,233 of the present inventor. Also, there are a multitude of prior known fishing lures in which all or portions of the lure rotate as the lure moves through the water. An example of such a lure is that disclosed in U.S. Pat. No. 2,157,414. However, the prior known rotating lure devices have universally employed hard metal, plastic or the like rotating components which are configured to sink below the surface of the water; and no known prior lure has employed a soft rubber-like body which is hollow and which is designed both for flotation on the surface of the water and for rotation in response to forward movement of the lure through the water.

SUMMARY OF THE INVENTION

It is therefore a primary object of the invention to provide a fishing lure which is configured to float on the surface of the water and to rotate in response to forward movement of the lure through the water.

It is another object of the invention to provide a fishing lure which is configured to cause a splash when one side rolls over and hits the surface of the water.

It is still another object of the invention to provide a fishing lure which can be used as a topwater bait, a buzz bait, or a jerk bait, depending upon the nature of its forward movement through the water.

These and other objects of the invention are achieved in a preferred embodiment of the present invention by a fishing lure which comprises a hollow rubber-like flexible body connected at its forward end to the rotary component of a conventional rotary bearing swivel device with a forward non-rotary portion designed for attachment to the fishing line and a rear portion comprising a rotary bell-shaped housing which freely rotates relative to the forward non-rotary portion. The hollow rubber-like flexible body component encloses a linkage connected on its forward end to the bell-shaped housing and on its rearward end to double hook members having shanks extending rearwardly internally of the hollow flexible component but having outer barbed ends positioned externally of the lure. The forward end of the hollow rubber-like flexible body component is contoured in the shape of a spiral-like propeller as viewed from the forward end so that rotation of the lure is effected by reactive force created by forward movement of the lure through the water. The propeller consists of two diametrically-opposed "blades" to provide the propeller with a flattened contour.

The rearward end of the flexible body component also has a flattened contour in the same plane as the propeller. The overall flattened contour of the flexible body component causes it to float when it strikes the surface of the water, and to create an unusual splash when a flattened side rolls over and strikes the surface of the water.

The double hook members exit the rearward end through a small aperture in the rearward end. When the lure is floating with the aperture downward, air inside the hollow flexible body component prevents water from entering; when the lure is floating with the aperture upward, its position above the water's surface prevents water from entering the aperture; and when the lure is spinning, and on its side in mid-turn, exposure of the aperture to the water is overcome by the speed and centrifugal force of the lure. Thus, the lure will continue to float even after prolonged periods in the water, due to its configuration. In one aspect of the invention, the flexible body component can be impregnated with glass microspheres to enhance its floatation.

The aforementioned rotation provides a visual attraction for fish and is thought to additionally create vibrations providing a further stimulus for attracting fish. Additionally, the flexible body component is distorted somewhat by forward and rotational movement through the water and returns to its original condition with such turn movement adding an additional life-like appearance of movement which is thought to be attractive to fish.

BRIEF DESCRIPTION OF THE DRAWINGS

FIG. 1 is a left front perspective view of a first embodiment of the invention in which a portion of the hollow rubber-like flexible body component has been removed for purposes of illustrating the interior of the device along a plane extending generally parallel through the longitudinal axis of the device;

FIG. 2 is a left side elevation view of the first embodiment;

FIG. 3 is a top plan view of the first embodiment;

FIG. 4 is a front elevation view of the first embodiment;

FIG. 8A is a perspective view of the second embodiment;

FIG. 9 is a left side elevation of the second embodiment;

FIG. 10 is a top plan view of the second embodiment;

FIG. 11 is a front elevation view of the second embodiment;

DESCRIPTION OF THE PREFERRED EMBODIMENTS

Figure 5:
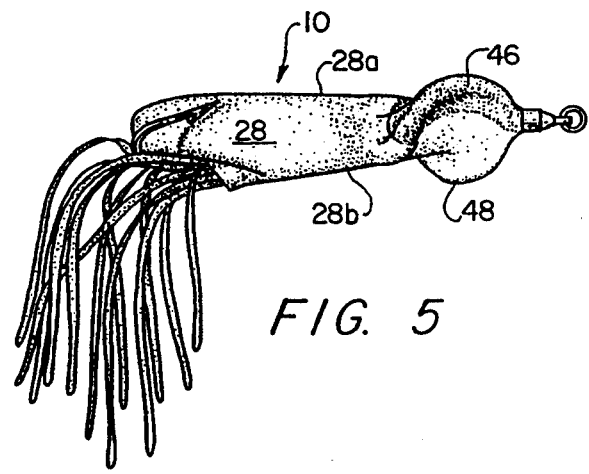
FIG. 5 is a right side elevation view of the first embodiment.
Figure 7:
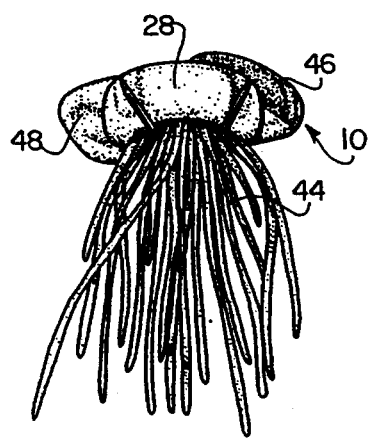
FIG. 7 is a rear elevation view of the first embodiment.
Figure 6:
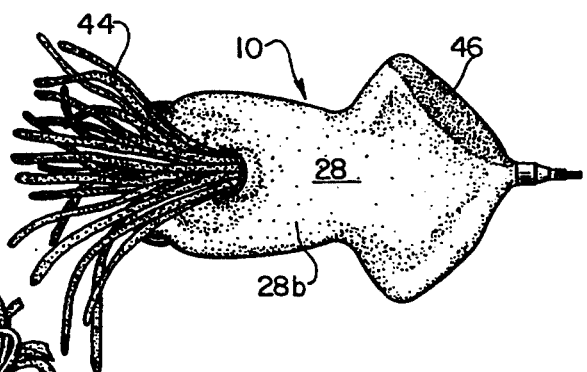
FIG. 6 is a bottom plan view of the first embodiment.
Figure 8:
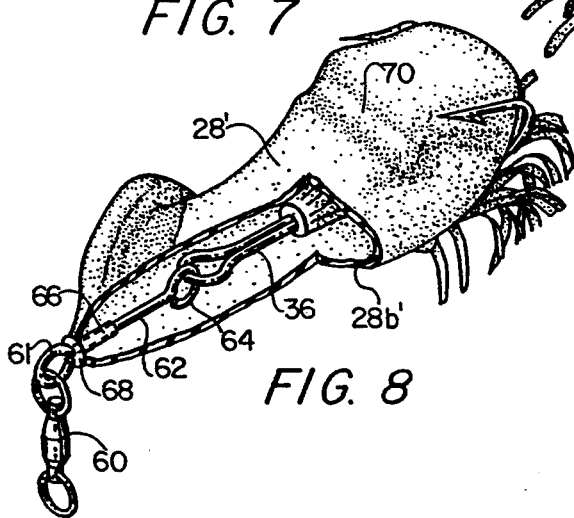
FIG. 8 is a perspective view with a portion cut away of a second embodiment of my new invention.
Figure 15:
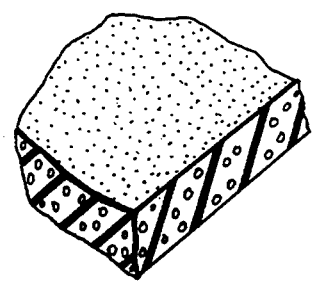
FIG. 15 is a cross-sectional view showing the material comprising the body component impregnated with glass microspheres.
Figure 12:
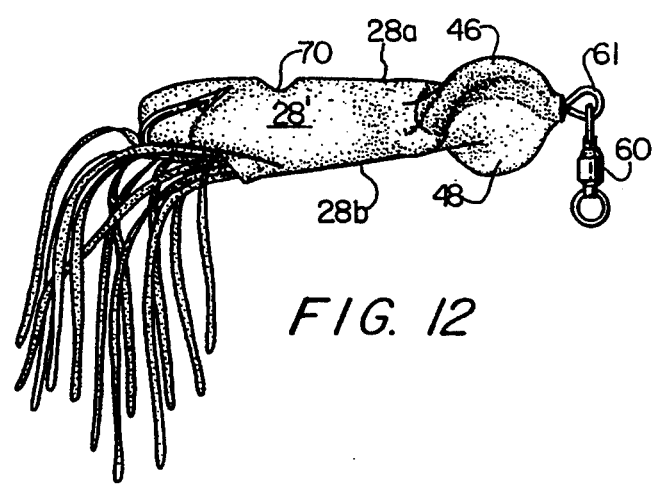
FIG. 12 is a left side elevation view of the second embodiment.

Attention is initially invited to FIG. 1 of the drawings which illustrates the preferred embodiment fish lure 10 of the invention which includes a forwardly located conventional rotary bearing swivel 20 having a forward end in the form of non-rotary rod 22 through which a closed loop link 24 extends so as to provide a means permitting the connection of a fishing line (not shown) for enabling movement of the lure through the water. The rear portion of the conventional swivel rotary bearing 20 comprises a hollow rotary bell housing 26 mounted for rotation about the longitudinal axis of the non-rotary rod 22 in a well-known manner.

A hollow, rubber-like body component 28 extends rearwardly from rotary bearing swivel 20, and is provided with a forward end, a rearward end, and a hollow interior chamber 30. The rearward end is generally flattened, with upper and lower surfaces 28a and 28b. Component 28 is preferably formed of polyvinyl chloride resin dispersion sold by Flexible Products Company of Marietta, Ga. under the product name DW 183-41. However, other similar materials could be used if desired. Also, the material forming component 28 can be impregnated with glass microspheres to enhance its floatation.

The forward end of hollow rubber-like flexible body component 28 engages the hollow rotary bell housing 26, while the hollow interior chamber 30 at the rearward end of hollow rubber-like flexible body component 28 encloses a link 32. Link 32 is connected at its forward end to a rotary link 34 mounted in a rearwardly extending axial protrusion of the bell housing 26 and is connected at its rear end to a double hook assembly 36 extending rearwardly through an aperture 38 in the lower surface 28b of the hollow body component 28.

Exposed external hook components 40 have barbed ends 42 positioned externally of but adjacent to the rear portion of the hollow rubber-like flexible body component 28. A conventional ribbon skirt 44 is mounted on the hook components 40 in a well known manner and includes a substantial number of plural ribbons which move and visually attract fish during forward movement of the lure through the water.

Figure 14:
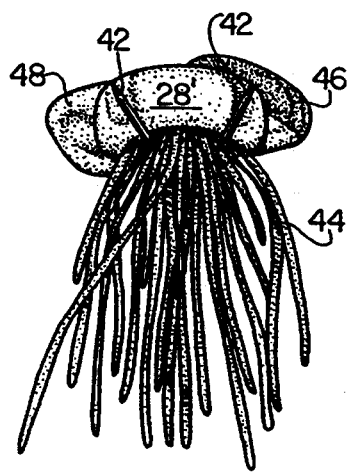
FIG. 14 is a rear elevation view of the second embodiment.
Figure 13:
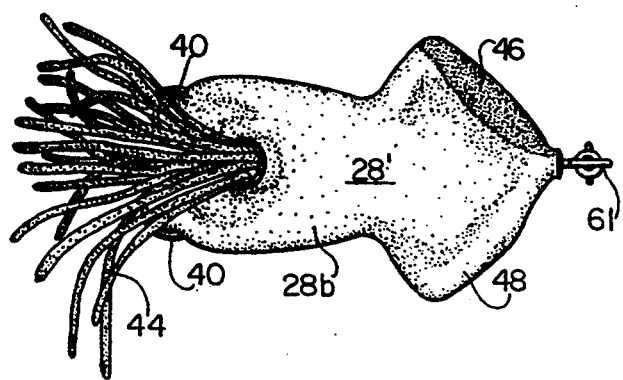
FIG. 13 is a bottom plan view of the second embodiment.

The forward end of the hollow rubber-like body component 28 includes reactive surfaces in the form of a propeller comprising a right propeller blade 46 and a left propeller blade 48. Because right and left propeller blades 46 and 48 are diametrically opposed, they provide the propeller with a generally flattened contour in the same plane as the rearward end of the hollow rubber-like body component 28, as best seen in FIGS. 4 and 14.

The configuration of the right and left blade 46 and 48 is such that forward movement of the lure through the water causes a reactive force against the blades which in turn causes the lure to rotate in a clockwise direction as viewed in FIG. 4. Since the right propeller blade constituent 46 is of a different color from the remainder of the lure, a flashing or blinking visual effect is resultant from such rotation. Further visual attractiveness is provided by undulating movement of the surface of flexible hollow component 28 which will occur with velocity change of the lure as it moves through the water.

A further advantage of the lure arises from the fact that the arms 42 of the hook component 40 are positioned inwardly of the outer radius of the rear portion of the lure as shown in FIG. 3, and are also positioned closely adjacent the surface of the hollow rubber-like body component so that it is extremely unlikely that the barbed ends 42 will engage, rocks, snags or other underwater hazards; however, the barbs are fully effective when the lure is struck by a fish since the hollow rubber-like body component 28 will be compressed by the striking force of the fish so that the barbs 42 will be effective to hook the fish.

FIGS. 8 through 14 illustrate an alternative embodiment of the invention which differs from the embodiment of FIGS. 1 through 7 in that it employs a totally external swivel 60 connected to the forward end 61 of a link 62 which has a rear most end 64 connected to the double hook assembly 36. It should be observed that the link 62 is positioned in a tubular sleeve 66 having a cap 68 on its forward most end. Link 62 is capable of axial movement in sleeve 68 and is also capable of limited rotation which will be limited by the fact that it is engaged with the double hook assembly 36 at its rearmost extent. A further difference of the second embodiment is that it employs a hollow rubber-like body component 28' which is different from the body component 28 of the first embodiment in that it has a transversely extending groove 70 extending across its rear portion forwardly of the barbs 42 of the hook members at best shown in FIGS. 8A and 9. The provision of the transverse groove 70 provides a slightly different action by the lure as it is moved through the water. All other respects, the second embodiment of the lure illustrated in FIGS. 8 through 14 is identical to the first embodiment and the same reference numerals are therefore used for the identical components of both embodiments.

It should be understood that the invention is not limited to the embodiments disclosed herein since many obvious modifications will undoubtedly occur to those of skill in the art. Therefore, the spirit and scope of the invention is to be limited solely by the appended claims.

I claim:

1. A fish lure having a longitudinal axis and comprising:
    a rotary bearing having a forwardly positioned non-rotary component connectable to a fishing line and a rearwardly positioned rotary component rotatable relative to said forward component;
    a hook having a forward end attached to said rotary component and a rearward end opposite said forward end; and
    a hollow, rubber-like body component extending rearwardly from said rotary rear component and having a forward end and a rearward end, said forward end of said body component including reactive surfaces which react with the water in response to forward movement of said lure through the water for causing rotation of said body component and said hook, and said rearward end of said body component being generally flattened with upper and lower surfaces and an aperture through said lower surface, said forward end of said body component enclosing said forward end of said hook, said rearward end of said hook exiting said rearward end of said body component through said aperture.

2. The fish lure as recited in claim 1, additionally including a ribbon skirt attached to said hook and trailing therefrom.

3. The fish lure as recited in claim 1, wherein said reactive surfaces comprise a spiral shaped component consisting of first and second propeller blades oriented diametrically opposite each other on opposite sides of said longitudinal axis.

4. The fish lure as recited in claim 1, additionally including a transverse, inwardly-extending groove provided in said upper surface of said body component.

5. The fish lure as recited in claim 4, additionally including a ribbon skirt attached to said hook and trailing therefrom.

6. The fish lure as recited in claim 5, wherein said reactive surfaces comprise a spiral shaped component consisting of first and second propeller blades oriented diametrically opposite each other on opposite sides of said longitudinal axis.

7. The fish lure as recited in claim 1, wherein said rotary bearing is completely external of said body component.

8. The fish lure as recited in claim 7, additionally including a transverse, inwardly-extending groove provided in said upper surface of said body component.

9. The fish lure as recited in claim 8, additionally including a ribbon skirt attached to said hook and trailing therefrom.

10. The fish lure as recited in claim 9, wherein said reactive surfaces comprise a spiral shaped component consisting of first and second propeller blades oriented diametrically opposite each other on opposite sides of said longitudinal axis.

11. The fish lure as recited in claim 1, wherein the rubber-like material forming said body component is impregnated with a material which increases its flotation.

12. The fish lure as recited in claim 1, wherein the rubber-like material forming said body component is impregnated with glass microspheres.

13. A fish lure having a longtudinal axis and comprising:
    a rotary bearing having a forwardly positioned non-rotary component connectable to a fishing line and a rearwardly positioned rotary component rotatable relative to said forward component;
    a hook having a forward end attached to said rotary component and a rearward end opposite said forward end; and
    a hollow, rubber-like body component extending rearwardly from said rotary rear component and having a forward end and a rearward end, said forward end of said body component including a spiral shaped component consisting of first and second propeller blades oriented diametrically opposite each other on opposite sides of said longitudinal axis to provide said spiral shaped component with a flattened contour, said spiral shaped component reacting with the water in response to forward movement of said lure through the water for causing rotation of said body component and said hook, and said rearward end of said body component having upper and lower surfaces with a generally flattened contour in the same plane as said spiral shaped component and an aperture through said lower surface, said forward end of said body component enclosing said forward end of said hook, said rearward end of said hook exiting said rearward end of said body component through said aperture.

14. The fish lure as recited in claim 13, additionally including a ribbon skirt attached to said hook and trailing therefrom.

15. The fish lure as recited in claim 13, additionally including a transverse, inwardly-extending groove provided in said upper surface of said body component.

16. The fish lure as recited in claim 15, additionally including a ribbon skirt attached to said hook and trailing therefrom.

17. The fish lure as recited in claim 13, wherein said rotary bearing is completely external of said body component.

18. The fish lure as recited in claim 17, additionally including a transverse, inwardly-extending groove provided in said upper surface of said body component.

19. The fish lure as recited in claim 18, additionally including a ribbon skirt attached to said hook and trailing therefrom.

20. The fish lure as recited in claim 13, wherein the rubber-like material forming said body component is impregnated with a material which increases its flotation.

21. The fish lure as recited in claim 13, wherein the rubber-like material forming said body component is impregnated with glass microspheres.

* * * * *

UNITED STATES PATENT AND TRADEMARK OFFICE
CERTIFICATE OF CORRECTION

PATENT NO. : 5,428,917
DATED : July 4, 1995
INVENTOR(S) : Roy D. Cunningham

It is certified that error appears in the above-identified patent and that said Letters Patent is hereby corrected as shown below:

At the title page, line [63], "Jul. 8, 1994" should be --Jul. 8, 1993--.

Signed and Sealed this

Fifteenth Day of August, 1995

Attest:

BRUCE LEHMAN

Attesting Officer         Commissioner of Patents and Trademarks